United States Patent [19]

McJunkin, Jr. et al.

[11] 4,352,148

[45] Sep. 28, 1982

[54] EQUIPMENT CORNER NOTCH-MOUNTED TRIANGULAR ENCLOSURE FOR TUBULAR LIGHT SOURCE

[75] Inventors: Howard P. McJunkin, Jr., Charleston; Larry W. Rowley, Sissonville, both of W. Va.

[73] Assignee: McJunkin Corporation, Charleston, W. Va.

[21] Appl. No.: 179,439

[22] Filed: Aug. 19, 1980

Related U.S. Application Data

[62] Division of Ser. No. 927,735, Jul. 24, 1978, Pat. No. 4,282,564.

[51] Int. Cl.³ .......... B60Q 1/00

[52] U.S. Cl. .......... 362/61; 362/80; 362/224; 362/367; 362/368; 362/369; 362/390

[58] Field of Search .......... 362/61, 80, 224, 367, 362/368, 369, 390

[56] References Cited

U.S. PATENT DOCUMENTS 4,052,806 10/1977 George .......... 362/223

4,158,880 6/1979 McJunkin .......... 362/367

*Primary Examiner*—Stephen J. Lechert, Jr.

*Attorney, Agent, or Firm*—Cushman, Darby & Cushman

[57] ABSTRACT

An angle iron forms two sides of a right isosceles triangular housing. These sides are each apertured and the apertures are provided with metal-framed lens plates which bolt onto the housing sides. Preferably, in one instance the lens material is mounted in the plate for ease of access to the interior of the housing and in the other instance the lens is mounted in the aperture and retained by the frame plate. A fluorescent lamp tube assembly is received inside the housing for providing illumination through both lenses. Access thereto is via removal of a metal-framed lens plate. The housing has mounting elements which permit a user to flush mount the housed light source, e.g. on a mining machine.

3 Claims, 9 Drawing Figures

EQUIPMENT CORNER NOTCH-MOUNTED TRIANGULAR ENCLOSURE FOR TUBULAR LIGHT SOURCE

REFERENCE TO RELATED APPLICATION

This is a division of application Ser. No. 927,735, filed July 24, 1978, now U.S. Pat. No. 4,282,564, issued Aug. 4, 1981.

BACKGROUND OF THE INVENTION

Commonly used fluorescent light source enclosures of the types currently used for illumination in underground mines, e.g. on mining equipment for illuminating the vicinity of a mining activity, generally is generally elongated-cylindrical in shape. A now-typical device is shown in the copending U.S. patent application of McJunkin, Jr., et al., Ser. No. 736,204, filed Oct. 27, 1976, now U.S. Pat. No. 4,247,884, issued Jan. 27, 1981 and in the U.S. patent of Dacal, U.S. Pat. No. 4,042,819, issued Aug. 16, 1977.

While the specific design of lighting enclosure varies from manufacturer to manufacturer, the basic shape necessitates that such enclosures be mounted on an exterior surface as an outward protrusion therefrom in order to take full advantage of their light output. That limitation necessitates that these prior art lighting enclosures be relatively highly exposed to threat of damage from collision between relatively moving structures, one of which is such a lighting device protruding from the structure on which it is mounted. If an attempt is made to recess such lighting fixtures in order to protect them from damage and/or to minimize the overall size of the machine so it can work in smaller spaces sacrifices light output—and it virtually eliminates easy servicing. That is so because these prior art enclosures are designed to be serviced through one end. Any recessing tends to prevent the easy access to those ends which users often find is essential.

The present applicant has previously invented and participated in the design of a side-access, triangular housing for bulb-type light sources. These are disclosed in the copending U.S. patent applications of McJunkin, Jr., Ser. No. 818,664, filed July 25, 1975, now U.S. Pat. No. 4,158,880, issued June 19, 1979, and McJunkin, Jr., et al., Ser. No. 800,436, filed May 25, 1977, now U.S. Pat. No. De. 250,970, issued Jan. 30, 1979. Some of the favorable attributes of the present invention, compared to the prior art cylindrical enclosures for fluorescent lamp tubes, are ones it shares with this prior art triangular housing for bulb-type light sources.

SUMMARY OF THE INVENTION

An angle iron forms two sides of a right isosceles triangular housing. These sides are each apertured and the apertures are provided with metal-framed lens plates which bolt onto the housing sides. Preferably, in one instance the lens material is mounted in the plate for ease of access to the interior of the housing and in the other instance the lens is mounted in the aperture and retained by the frame plate. A fluorescent lamp tube assembly is received inside the housing for providing illumination through both lenses. Access thereto is via removal of a metal-framed lens plate. The housing has mounting elements which permit a user to flush mount the housed light source, e.g. on a mining machine.

Since the sides of its 45°-90°-45° transverse cross-sectional shape can form an external corner, with the provision of 45° notch at a machine outer corner, the enclosure of the invention can be mounted completely and altogether flush with the exterior of the mining machine. Such a mounting is without sacrifice to either useable light output or serviceability.

These are considered basic, important advantages in the mining machine lighting field.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION OF THE PRESENTLY PREFERRED EMBODIMENT

Figure 1:
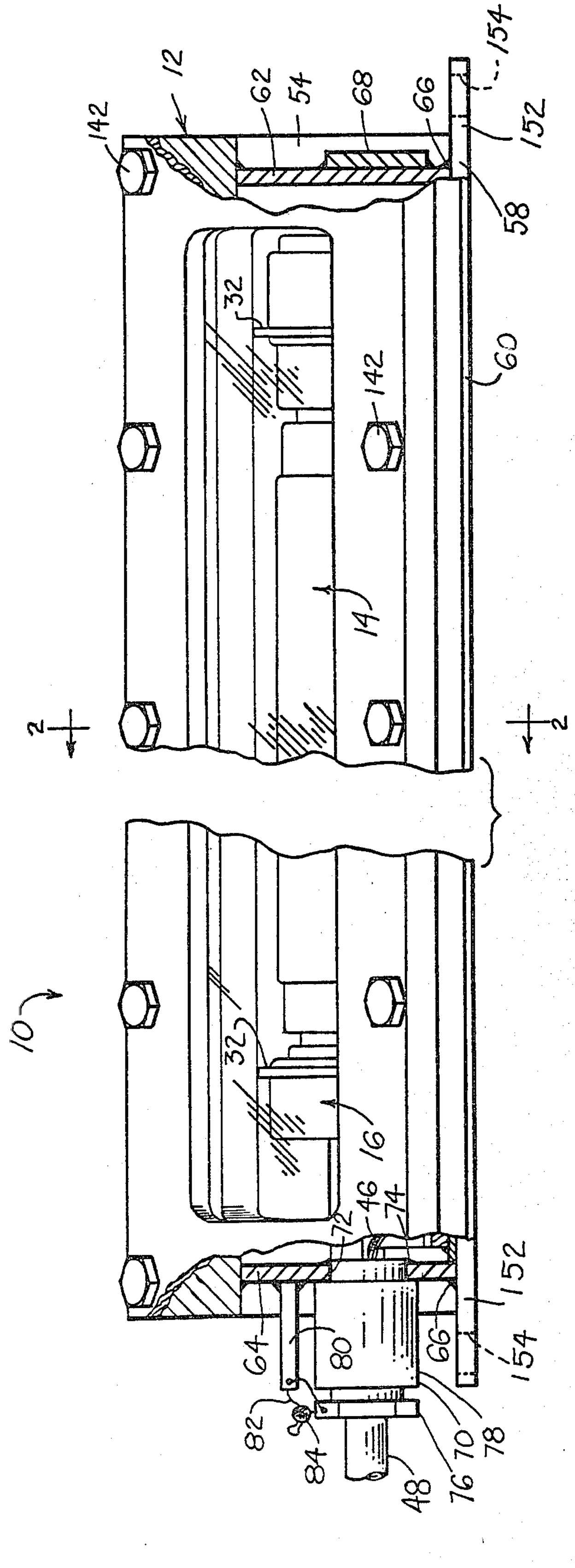
FIG. 1 is a side elevational view of a fluorescent lighting fixture including a triangular enclosure for a tubular light source, provided in accordance with principles of the present invention, parts being broken away to expose internal details and to elide repetitive structure.
Figure 2:
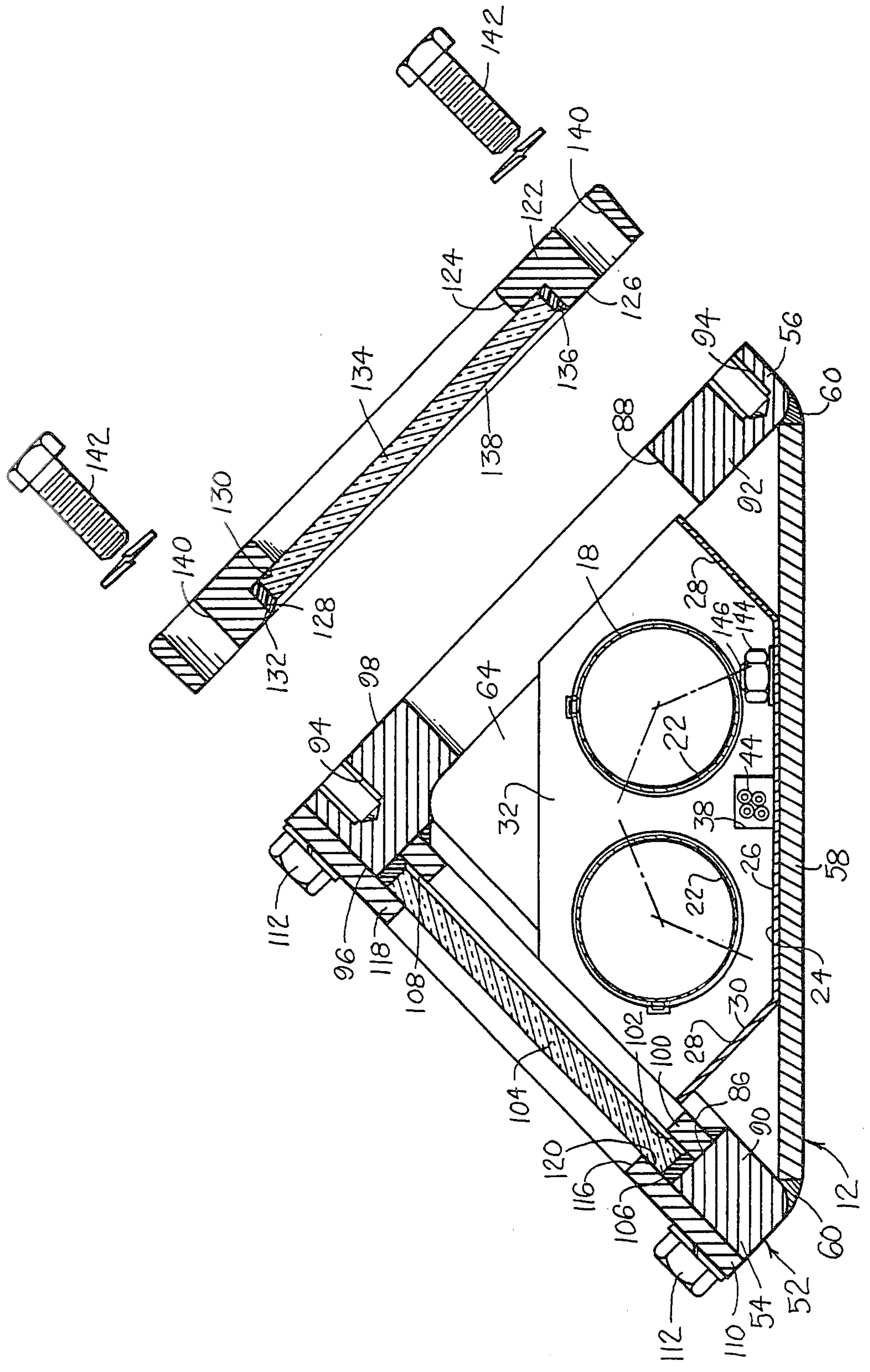
FIG. 2 is an exploded transverse cross-sectional view taken substantially on line 2—2 of FIG. 1.

The lighting fixture 10 includes a housing 12 for a tubular light source 14 and its mounting assembly 16. (See FIG. 1).

Of these, the lighting source 14 may be utterly conventional, for instance a pair of laterally adjacent parallel rod-like fluorescent lamp tubes 18, particularly ones which have contact pin assemblies 20 at both ends and which have internal reflectorized surfaces 22, e.g. extending from end to end and angularly over an arc of about one-third the circumference of each tube.

The mounting assembly 16 includes an elongated tray 24 which is longer than the tubes and has a flat central portion 26 flanked along each laterally opposite edge by a wing 28 which (in the orientation shown in FIGS. 1-7) extends obliquely outwardly and upwardly, e.g. at a 45° angle. The front surface 30 of the mounting assembly tray 24 may be reflectorized also.

Erected on the tray 24, and secured in place are two webs 32. (In FIG. 3, most of the webs 32 are broken away in order to show other details.) Each has a base edge which fits the transverse profile of the tray 24, where it is secured, e.g. welded thereto as at 34. The upper edge of each web 32 is profiled similarly to its base edge, so each one looks hexagonal as seen frontally. Each web 32 has two side-by-side openings 36 through it generally centrally thereof, and centered below them, contiguously with its base edge is notched, as at 38.

Also, laterally between the notches and one side edge of the tray central portion 26, the tray 24 is shown provided with two longitudinally spaced openings. These provide securement means for removably mounting the tray to the housing 12.

Each opening 36 receives a conventional lamp tube contact pin connector socket 40 which is mounted therein. Accordingly, two sockets 40 open toward one another in longitudinal alignment from mountings on the respective two webs 32, and another two do the same thing respectively laterally beside the first two. Each two sockets which are in longitudinal alignment conventionally removably mount a lamp tube 18 between them.

Figure 8:
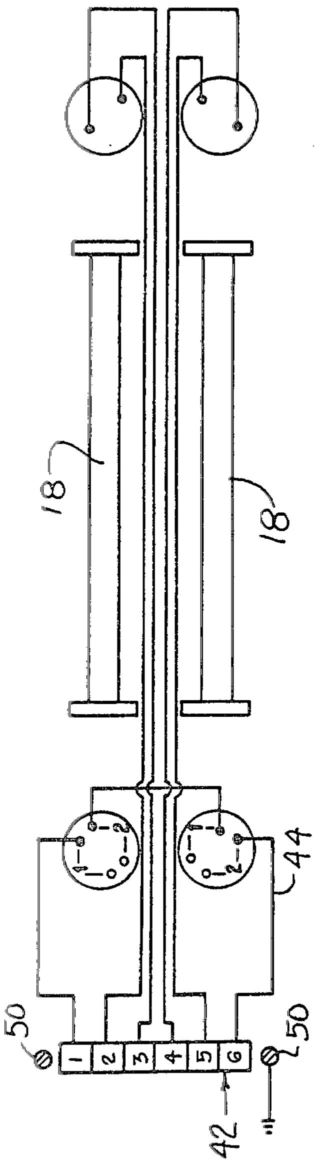
FIG. 8 is a typical schematic wiring diagram for the fixture of FIG. 1.
Figure 5:
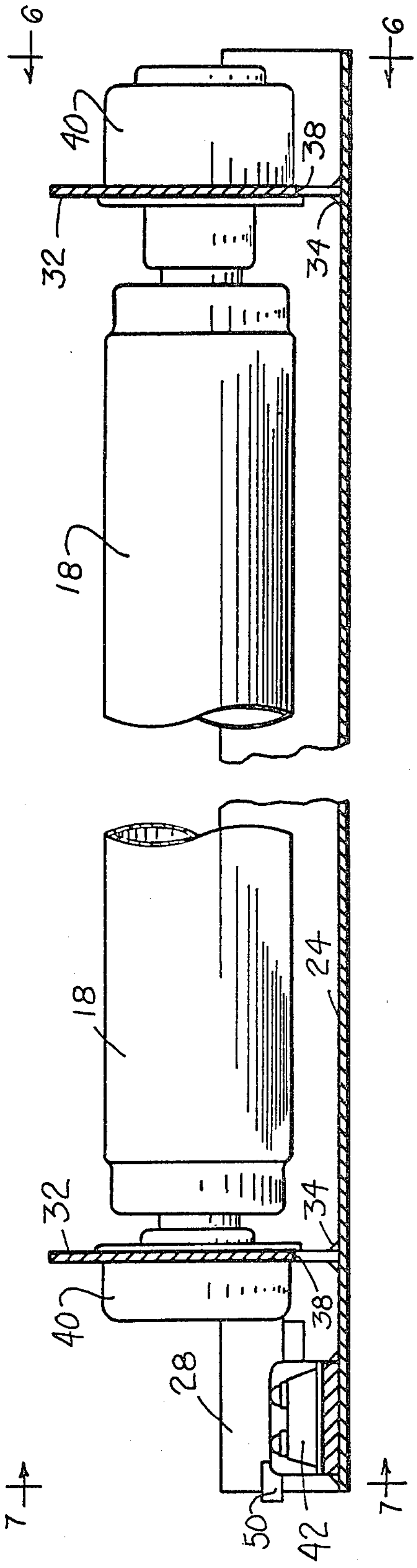
FIG. 5 is a longitudinal vertical cross-sectional view of the tubular lighting source and its mounting assembly, shown in an unwired condition.
Figure 6:
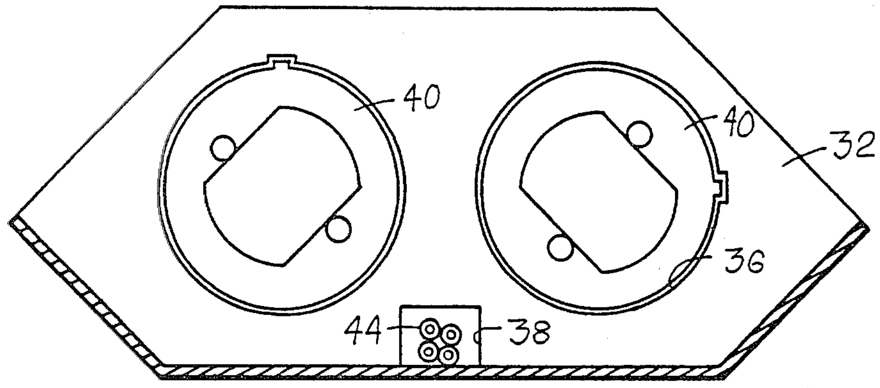
FIG. 6 is a vertical, transverse cross-sectional view thereof taken on line 6—6 of FIG. 5.
Figure 7:
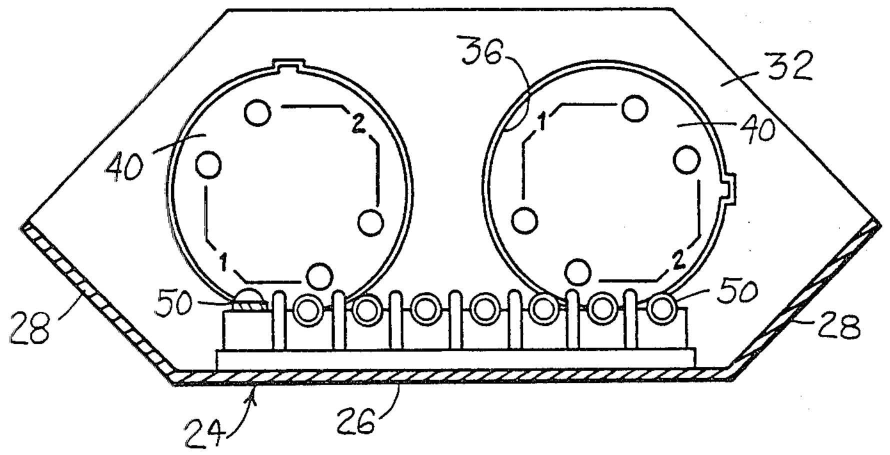
FIG. 7 is a vertical, transverse cross-sectional view thereof taken on line 7—7 of FIG. 5.

As shown, the webs 32 are assymetric relative to the magnitude of their adjacency with the respective nearest ends of the tray 24. The web which is furthest from the respective nearest tray end leaves room for there to be mounted on the central portion 26 just beyond that web 32 a terminal block 42. Typical wiring of the sockets 40 to one another and to the terminal block 42 is suggested at 44 in FIGS. 1, 2, 3 and 6 and is schematically illustrated in FIG. 8, with respect to terminals marked 1-6. The conductors 46 of the electrical cable 48 which serves the housing 12 are electrically connected to the terminal block 42 at 50.

What has not been described in detail so far, are the housing 12 proper, its relation to the light source and mounting assembly 14, 16 and installation of the lighting fixture 10, e.g. on mining equipment. Those details now follow.

The housing 12 preferably is a very rugged structure. It is fabricated in the preferred embodiment, although more of it might be cast as an integral unit should the preference arise. As shown, the housing 12 is based on a structural steel shape, specifically an angle iron 52 which provides two sides 54, 56 of the housing body, these sides meeting at a right angle. The hypotenuse of this generally triangular structure (viewed end wise or in transverse cross-section) is provided by a flat base plate 58 that is welded at 60 along its laterally opposite side margins to sides 54, 56 at their outer edges. The two opposite ends of the housing 12 are provided by respective isosceles right triangular plates 62, 64 perimetrically welded as at 66 to the sides 54 and 56 and base 58. The end plate 62 may be plain, or, e.g. externally be the site of a metal label 68, secured, e.g. by rivets. The label 68 may contain, e.g. manufacturer and/or product identifying information and/or instructions. Other labels may be provided on the device for these and/or other purposes as and where needed.

The electrical cable 48 passes into and from the housing via a conventional, e.g. M.E.S.A.-approved, gland fitting 70 that is mounted in the end wall 64 through an opening 72, and is circumferentially secured thereto, e.g. by welding as at 74. The electrical cable 48 thus is fed to the housing in an explosion-proof manner via the gland fitting 70. Disassembly of the fitting 70 may be accomplished by wrenching on the lands 76 relative to the tubular part 78 that is welded to the housing at 74. While such disassembly needs to be permitted, it should not be done lightly by unauthorized persons. Otherwise the explosion-proofness could not be relied upon. Accordingly, a seal post 80 is welded on the end wall 64 as it projects outwardly; a seal wire 82 is threaded through the seal post and through the nut member which bears the lands 76 and a seal wafer 84 is impressed on the seal wire to make a loop which prevents casual disassembly. Any disassembly must be accompanied by breaking the seal wafer and/or the seal wire loop.

Each housing side 54, 56 has a respective, large aperture 86, 88 cut therethrough which is perimetrically bordered by remaining material 90, 92 of the respective side. In the preferred embodiment, both the sides 54, 56 and the apertures 86, 88 are generally rectangular in shape. The border regions 90, 92 are each provided with a series of threaded sockets 94 which open outwardly, normally of the respective outer faces 96, 98 of the sides 54, 56.

Within the aperture 86, intermediate the thickness of the side 54, there is provided a perimetrical flange 100 which effectively perimetrically constricts the area of the aperture intermediate the depth thereof and provides an outwardly facing shoulder 102.

A lens of appropriate transparent or translucent glass plate, plastic material or the like 104 is fitted into the aperture 86 and sealed in place with a resilient sealing adhesive compound 106 or the like. The exterior of the lens 104 is flush with the surface 96 of the side 54, but the interior surface is slightly gapped from the shoulder 102 as shown at 108.

In addition, there is provided a metal framing plate 110. It has generally the same outer peripheral shape as the side 54 and its secured to it by a plurality of bolts 112 threaded through openings 114 (which are arranged in a pattern matching that of the sockets 94) and into said sockets and tightened.

The plate 110 is centrally provided with an aperture 116, substantially of the same size and shape as the aperture 86, as constricted by the flange 100, so that the inner border region 118 of the plate 110 bridges over the potting compound 106 and an outer peripheral border region of the lens 104, which its inner face 120 engages.

In normal use, the plate 110 would remain secured in place. If, however, the lens 104 is accidentally broken, it may be removed and replaced by removing the plate 110, removing the broken lens and removing the sealing compound 106, potting a new lens in place and restoring the plate 110 to its place as shown.

On the side 56, the structure is somewhat different, because it is through the aperture 88 through this side that access may be more easily had to the interior of the housing 12, e.g. for replacing burned-out light sources 14.

For the side 56, there is provided a metal framing plate 122 that, as shown, is substantially thicker than the plate 110. The plate 122 is of generally rectangular frontal figure, with a centered generally rectangular aperture. From the back or inner face 126, the plate 122 is provided with a generally rectangular-sectioned recess 128, contiguous with and extending perimetrically of the aperture 124, so as to provide an inwardly facing perimetrical shoulder 130 and a recess sidewall 132. The latter extends through, e.g. about half the thickness of the plate 122. A lens 134, similar to the lens 104, is received in the recess 128 and perimetrically potted thereto as at 136. The lens 134 is thinner than the recess is deep, so that, there is provided a gap 138 between the inner side of the lens 134 and the inner face 126 of the plate 122.

The plate 122, intermediate its inner and outer peripheries is provided, through its thickness, with a ring of bolt holes 140 in series, sized and spaced to respectively axially align with corresponding threaded sockets 94 in the border region 92 of the housing side 56.

For the principal presently intended environment of use—coal mines—the housing 12 must be explosion-proof. In general, that means that the fixture must be sufficiently rugged to physically contain any explosion set off within, and/or to lead explosion gases on their way out of the device when an explosion has occurred therein, through a sufficiently long path, in contact with sufficiently effective heat exchange surfaces, that upon emergence from the housing, these gases are insufficiently hot, energetic and reactive as to generate or feed explosive chain reactions outside the housing.

In pursuit of that objective, both the outer surface 98 of the side 56 in the border 92 and the corresponding inner surface 126 of the metal framing plate 122 are machined to a relatively high degree of flatness, e.g one hundred twenty-five microns rms maximum surface roughness.

(The other corresponding surfaces of the side 54 and framing plate 110, when designed to be semi-permanently installed, as described above, need not be machined to such a high degree of smoothness.)

Accordingly, when the lens framing plate 122 is bolted in place with bolts 142 extending through the bolt holes 140 into the corresponding threaded sockets 94, and sufficiently tightened an explosion-proof housing 12 is created.

Should there be a need to service the light source 14 and/or its mounting assembly 16, it is a relatively simple matter to remove the bolts 142, remove the framing plate 122, and to have access to the light source 14 and its mounting assembly 16 through the aperture 56. For simple changing of a fluorescent lamp tube, removal of the mounting assembly 16 may not be needed. However, should the need arise, greater access to the light source 14 and/or its mounting assembly 16 may be gained by removing the nuts 144 from the two threaded studs 146 which are threaded through two pairs of corresponding openings 148, 150 in the flat central portion 26 of the tray 24 and in the base plate 58, respectively.

Figure 3:
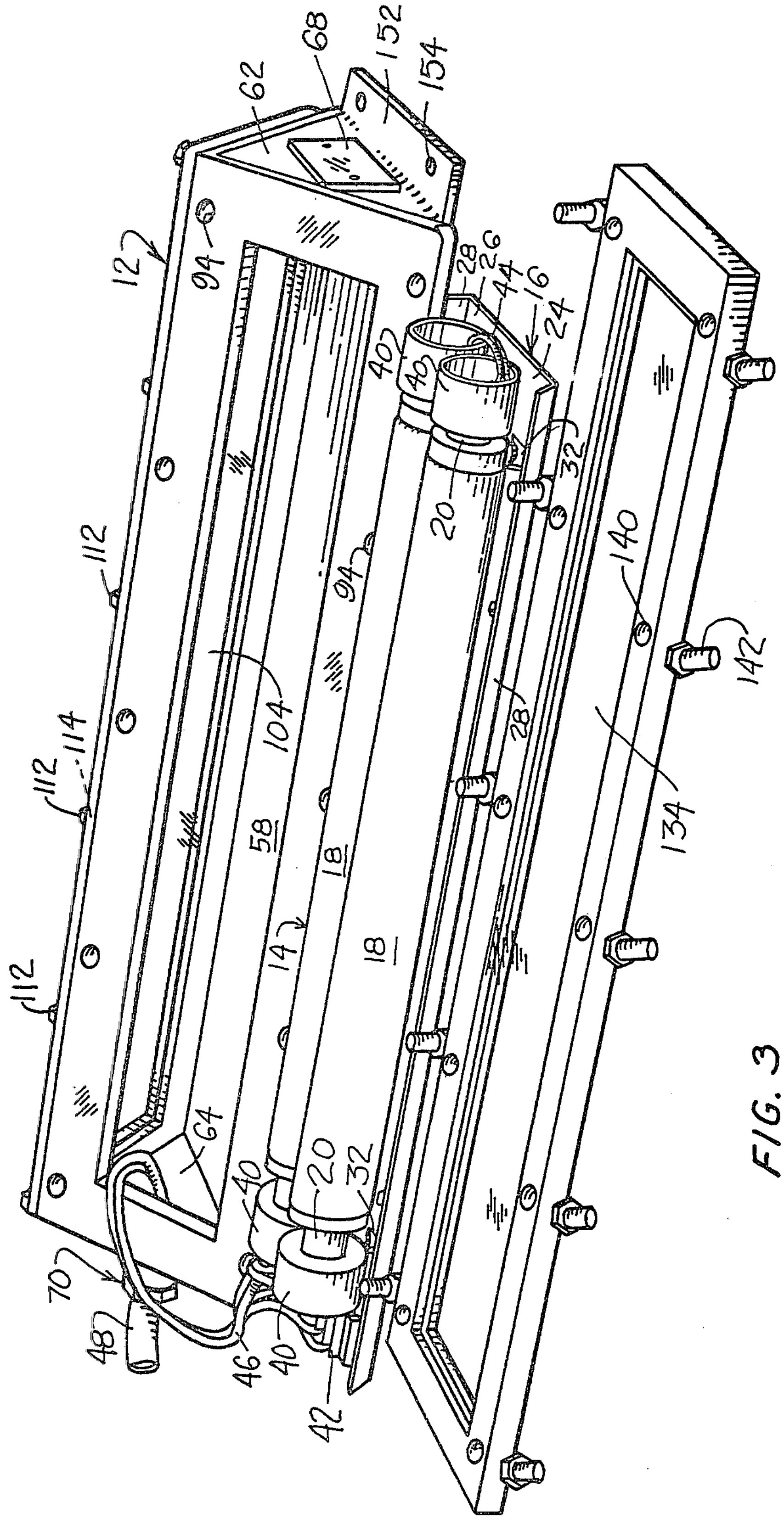
FIG. 3 is a perspective view showing the tubular light source and its mounting assembly lifted outside the enclosure through a housing aperture after removal of the lens plate.
Figure 9:
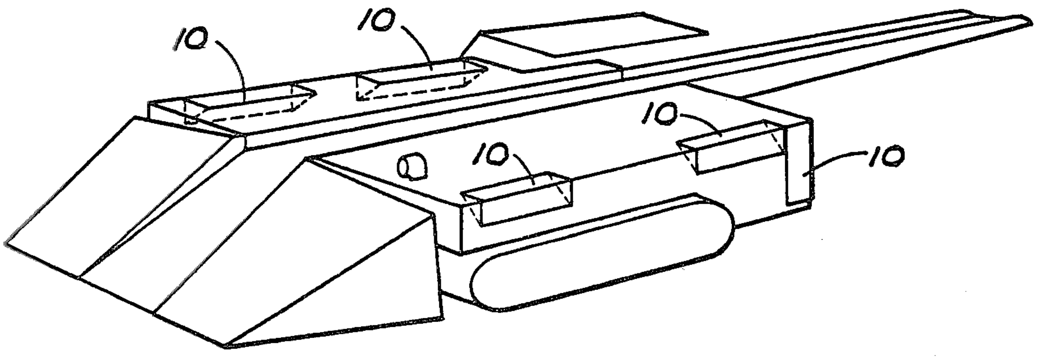
FIG. 9 is a small scale schematic perspective view of a typical mining machine having several of the enclosures flush mounted at outer corner edges of the machine to illustrate their compactness when so installed.
Figure 4:
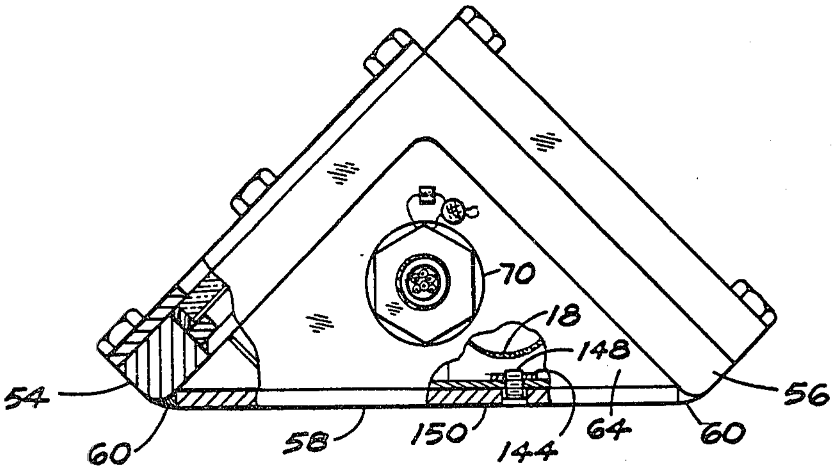
FIG. 4 is an end elevational view of the device, with parts broken away to expose internal details.

Then, the light source 14 and its mounting assembly 16 may be lifted out through the aperture 88 as shown in FIG. 3. (When the device is originally wired, a sufficient length of wire is left between the terminal block 42 and the gland fitting 70 to permit the light source and its mounting assembly to be lifted out of the housing through the aperture as shown in FIG. 3.)

The lighting device 10 may be conveniently provided as a recessed fixture for an exterior corner on a mining machine. In such a case, the machine is provided with a 45° chamfered corner recess. The base plate 58 is shown provided at its opposite ends with protruding flange portions 152 having bolt holes 154. This provides one means for mounting the lighting device 10 to a surface, such as to a mounting surface on a mining machine as aforesaid. When flush-mounted vertically at a left or right outer corner of such a machine, the device 10 is positioned to light both longitudinally and transversally outwardly either to the left or right of the path of the machine. When flush-mounted horizontally at an upper or lower outer corner of such a machine, the device 10 is positioned to light both longitudinally and transversally vertically of the path of the machine, either upwards or downwards.

Of course, the lighting device 10 need not be mounted in a recess or at a corner, but can be mounted on a flat surface, either on a machine or on a stationary support.

The drawings show a preferred size, manner of construction and number of light sources. With use of commercially available structural steel angle iron for the two apertured-lensed sides of the housing, fabricating steps are reduced and the result is a very sturdy fixture, typically weighing more than sixty pounds.

The enclosures of the present invention may be integrated into the construction of new mining machines, and this is the typical use contemplated. Also they may be installed in used machines when they are being rebuilt, and may be retrofitted onto other existing mining machines. Further, the enclosures may be mounted on other equipment used in somewhat analogous contexts, e.g. on off-road construction equipment, on ships, boats and barges, on petroleum exploration rigs and platforms, and on stationary structures in these and other like environments.

The specific embodiment shown can be modified while continuing to make use of the principles of the invention. Particularly, the number and size of the fluorescent lighting tubes to be housed therein can differ, as can the shape of the reflector/mounting plate, the size of the enclosure, and similar factors.

As new and hybrid lighting sources are developed over the years it is entirely likely some new lamp tubes will become available which have the same basic straight rod-like tubular shape as today's fluorescent lamp tubes, and be useful in the same or similar sockets, yet not properly be called "fluorescent" lamp tubes, the use of the term "fluorescent" lamp tubes as used herein is meant to encompass both the objects commonly so-called today and any equivalent such developments.

It should now be apparent that the triangular enclosure for tubular light source as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. An electric lighting system, comprising:
- a substrate having two walls which meet at an approximately right angle at an outside corner having an outer edge;
- said corner, along at least a portion of the length thereof being obliquely relieved to provide a notch in said outer edge;
- a triangular enclosure for a tubular light source, comprising:
- a unitary housing of generally isosceles right triangular transverse cross-sectional shape, thus having two sides which meet along a common border at generally a 90° angle, and each of which has a respective outer border where it is joined to the respective outer edge of a base plate; said housing further including two opposed generally triangular end walls securely located at opposite ends of said sides and base plate;

gland fitting means being provided in one of said end walls for communicating an electrical cable through the housing to and from the inside of the housing;

means defining an aperture through each said side;

two light transmitting lenses;

means mounting a respective said lens covering each said aperture;

said mounting means in respect to one of said apertures removably mounting the lens to the respective side, in order to permit access to within the housing through the respective aperture;

means mounting said triangular enclosure in said notch so that said two sides thereof are substantially flush with said two walls of said substrate and so that said common border of said two sides is substantially aligned with said outer edge of said outside corner of said two walls.

2. The electric lighting system of claim 1, further including:

an electrical cable passing through said gland fitting and into said housing;

a light source mounting assembly which is insertable into said unitary housing and withdrawable therefrom via said one aperture upon removal of said removably mounted lens;

said light source mounting assembly including: a tray; means mounting at least one electrical socket on said tray; means providing at least one terminal post on the tray and electrically connected with the at least one electrical socket; and means for removably securing the tray to the housing for use when the light source mounting assembly is positioned within the housing; said electrical cable, within said housing being secured to said terminal post means with sufficient slack therein between said gland fitting and said terminal post means as to permit said light source mounting assembly to be removed from the housing, through said one aperture, while said electrical cable remains connected to said terminal post means.

3. The electric lighting system of claim 2, wherein:

said substrate is a mobile mining machine for underground coal mining;

said triangular enclosure further including surface means providing an explosion-proof joint between said mounting means for the light transmitting lens for said one aperture and the respective said side of the housing, including a sufficiently long path as to render escaping gases from within the housing incapable of initiating atmospheric explosion in coal mining use.

* * * * *